United States Patent [19]

Wakasa

[11] Patent Number: 4,579,185
[45] Date of Patent: Apr. 1, 1986

[54] HOOD FOR AN AUTOMOTIVE VEHICLE

[75] Inventor: Yasuo Wakasa, Fujisawa, Japan

[73] Assignee: Nissan Motor Co., Ltd., Yokohama, Japan

[21] Appl. No.: 478,515

[22] Filed: Mar. 24, 1983

[30] Foreign Application Priority Data

Apr. 9, 1982 [JP] Japan .................................. 57-58227

[51] Int. Cl.$^4$ ............................................. B62D 25/10
[52] U.S. Cl. .................................. 180/69.2; 180/69.21;
280/784; 296/76; 428/167
[58] Field of Search ........................... 180/69.2, 69.21;
280/784; 428/167; 296/76

[56] References Cited

U.S. PATENT DOCUMENTS

| | | | |
|---|---|---|---|
| 2,517,860 | 8/1950 | Forgy | 280/784 |
| 3,709,316 | 1/1973 | Glance | 180/69.21 |
| 3,909,058 | 9/1975 | Kramer et al. | 180/69.21 |
| 4,133,549 | 1/1979 | Reidelbach et al. | 280/784 |
| 4,308,307 | 12/1981 | Heath et al. | 180/69.2 |

FOREIGN PATENT DOCUMENTS

| | | | |
|---|---|---|---|
| 2649955 | 5/1978 | Fed. Rep. of Germany | 280/784 |
| 2840689 | 3/1980 | Fed. Rep. of Germany | 280/784 |

Primary Examiner—Richard A. Bertsch
Attorney, Agent, or Firm—Schwartz, Jeffery, Schwaab, Mack, Blumenthal & Evans

[57] ABSTRACT

A hood for an automotive vehicle, contains a hood panel. The hood panel has a pair of flanges being formed by inwardly folding both side edges of the hood panel. The flanges have deformable portions respectively which are formed in central positions of the substantial entire length of the flanges. The deformable portions doubles the hood panel when a strong impact is applied to the food panel in the front-rear direction of the automotive vehicle upon collision accidents, whereby the hood panel does not plunge into the passenger room of the vehicle in case of accidents.

13 Claims, 5 Drawing Figures

HOOD FOR AN AUTOMOTIVE VEHICLE

BACKGROUND OF THE INVENTION

The present invention relates to a hood for an automotive vehicle, and more particularly to a shock absorbing hood having a construction for providing an improved safety of a passenger in case of an accident.

It is necessary in general to reinforce the strength of a hood panel for an automotive vehicle. As one of the ways for improvement in such strength for this purpose, there is known such a hood that a reinforcement member is laid substantially on the lower surface of the hood panel, and the reinforcement member is attached by hemming and bonding its edges with edges of the hood panel.

There is also known such a hood 10 as shown in FIG. 1 as another hood which is small and light-weighted for recent saving-energy demands. In this type of prior art hood 10, the reinforcement member is completely disused, or a part thereof is eliminated. In exchange for this, both side edges of a hood panel 12 are bent downwardly to form flanges 14, 14' as reinforcement portions, thereby maintaining the strength of the hood 10 at least at a prescribed level.

However, in a conventional hood 10 for an automotive vehicle as described above, the mechanical strength of the hood 10 in the longitudinal direction, namely, in the front-rear direction of the automotive vehicle, is almost equal at any position, so that upon collision accident or the like, the hood panel 12 is not folded by the exertion of the impact in the direction of arrow A in FIG. 1, that is from the forward direction. Therefore, in the worst case, the unfolded hood panel 12 breaks through the front windshield glass and plunges into the passenger room; therefore, there is a problem in consideration of protection of passengers against accidents.

SUMMARY OF THE INVENTION

It is therefore an object of the present invention to provide an improved hood for an automotive vehicle which obviates the above described various drawbacks inherent in the prior art.

It is another object of the invention to provide a hood having a prescribed strength, which can substantially absorb the impact in the front-rear direction of an automotive vehicle.

It is a further object of the invention to provide a hood which can prevent the plunge thereof into the passenger room in case of accidents, thereby minimizing the injury of a driver and passengers.

It is still another object of the invention to provide a shock absorbing hood which enables easy production by forming deformable portions which are easily deformed by the impact of collision accident.

It is a further object of the invention to provide an effective shock absorbing hood which does not lose an alternative outside appearance as an entire automotive vehicle.

Briefly described, these and other objects of the invention are accomplished by the provision of an improved hood containing a hood panel. The hood panel has a pair of flanges being formed by inwardly folding both side edges of the hood panel. The flanges have deformable portions respectively which are formed in central positions of substantially the entire length of the flanges. The deformable portions double the hood panel when a strong impact is applied to the hood panel in the front-rear direction of the automotive vehicle upon collision accidents, whereby the hood panel does not plunge into the passenger room of the vehicle in case of accidents.

BRIEF DESCRIPTION OF THE DRAWINGS

These and other objects, features and advantages of the present invention will be more apparent from the following description of a preferred embodiment, taken in conjunction with the accompanying drawings, in which.

DETAILED DESCRIPTION OF THE PREFERRED EMBODIMENTS

Figure 1:
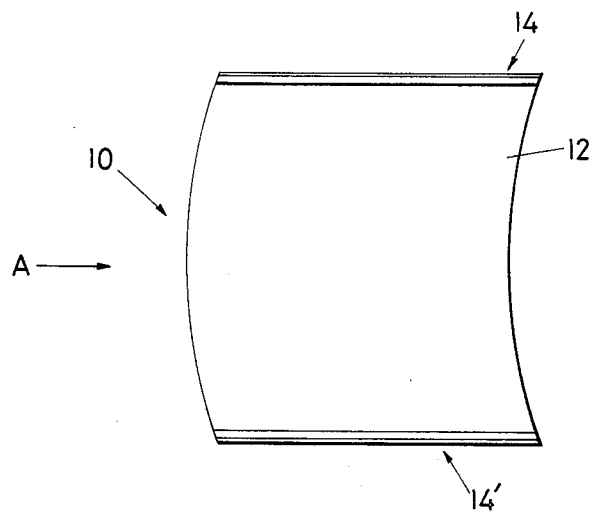
FIG. 1 is a rear side elevational view of a conventional hood for an automotive vehicle.
Figure 2:
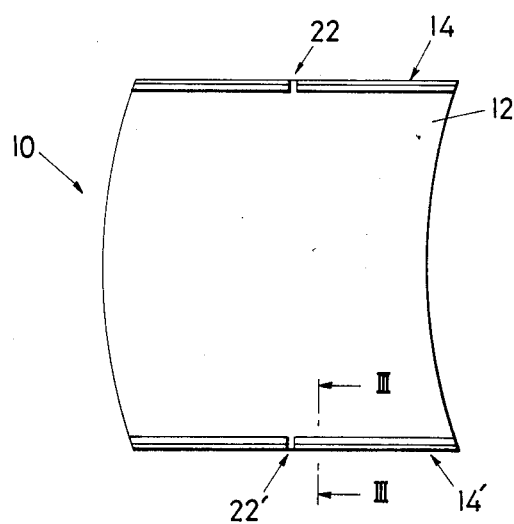
FIG. 2 is a rear side elevational view of a hood embodying the present invention.

Referring to FIG. 2, there is generally indicated at 10 an embodiment of a hood, which covers an upper side of a front engine room in a automotive vehicle. The hood 10 has flanges 14, 14' at both its side edges. The same reference numerals indicate the similar and corresponding components as conventional ones of FIG. 1. The flanges 14 and 14' are formed by inwardly folding both side edges of a hood panel 12. Since the constructions of the flanges 14 and 14' are symmetrical, only one flange 14 will be described hereinafter.

Figure 3:
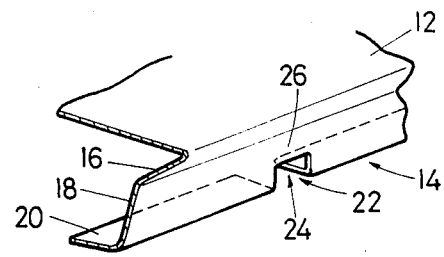
FIG. 3 is an enlarged sectional perspective view taken along line III—III of FIG. 2.

As shown in FIGS. 2 and 3, the flange 14 includes a slant plate 16, a side plate 18, and a bottom plate 20. A deformable portion 22 is formed in the central position of the entire length of the longitudinal flange 14. The deformable portion 22 includes a notch portion 24 and an upper portion 26. The notch portion 24 is formed by cutting the bottom plate 20 and the lower portion of the side plate 18 by only a very narrow space as compared with the entire length of the flange 14. The upper portion 26 is formed by the remaining upper section of the side plate 18 located immediately above the notch portion 24.

The function of the hood in accordance with this embodiment is now described hereinafter.

Figure 4:
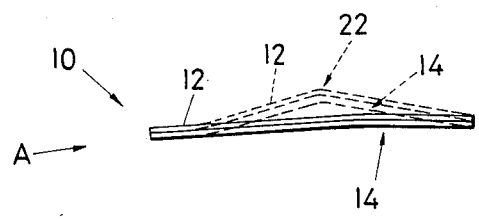
FIG. 4 is a side elevational view showing the state of the hood in which the hood is folded by the shock.

As shown in FIG. 4, in the case where a strong impact exceeding a predetermined load is applied to the hood panel from the direction indicated by an arrow A upon a collision accident or the like, the impact load is centralized to the aforementioned deformable portion 22, in particular, to the upper portion 26 of the deformable portion 22. Thus, the side plate upper portion 26 is first subject to deformation, and the flange 14 is essentially folded toward the upper surface of the hood panel 12 thereafter. At the same time, the other deformable portion 22' is also deformed in like manner; consequently, the above hood panel 14 is bent upwardly along the line between the deformable portions 22 and 22' thus doubled as shown by the broken lines of FIG. 4. Therefore, the hood 10 is prevented from breaking through the front windshield and plunging into the passenger room.

Although the notch portion 24 of the deformable portion 22 partially reduces the strength of the hood 10, the upper portion 26 of the deformable portion 22 ensures enough strength which is ordinarily necessary for the above-stated hood 10.

Figure 5:
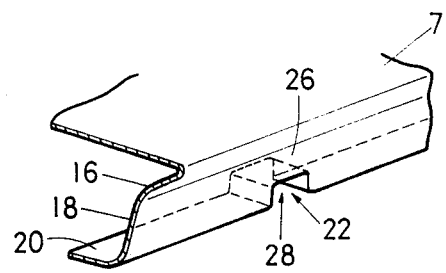
FIG. 5 is an enlarged sectional perspective view of a second embodiment of the hood according to the present invention.

Referring to FIG. 5, there is shown a second embodiment of the hood according to the present invention. In this embodiment, the same parts and components as those shown in FIGS. 2 and 3 are designated by the same reference numerals and will not be described any further for the purpose of simplicity.

This embodiment is similar to the first embodiment in basic construction but differs therefrom concerning that part of the deformable portion 22. This deformable portion 22 includes a dent section 28 in which the bottom plate 20 is formed in the trapezoid shape toward the hood panel 12 instead of notching the bottom plate 20 as shown in the first embodiment. It is needless to say that, with such a construction as shown in FIG. 5, the similar upward doubling deformation effect as in the notch structure of the first embodiment can be derived. In addition, absence of the notched edges of the deformable portion 22 of this embodiment is further expected to improve the external appearance.

In the above-mentioned embodiments, the deformable portion is formed in the flanges at both side edges of the hood panel. However, in a hood which is excellent in design or in a hood having the flanges formed in its front and rear ends, it is possible to construct the deformable portions by forming beads or the like on the surfaces of the hood panel. The shape of the deformable portion is not dimensionally limited to the trapezoid shape, but it is possible to adopt any shape which can provide easy deformation upon accidents.

Although preferred embodiments of the invention are specifically illustrated and described herein, it will be appreciated that many modifications and variations of the present invention are possible in light of the above teachings and within the purview of the appended claims without departing from the spirit and intended scope of the invention.

What is claimed is:

1. In an automotive vehicle wherein a front engine room is covered at its upper side by a hood, the hood containing a hood panel, the improvement comprising:
   at least one reinforcement portion made of a plate for maintaining the strength of said hood panel at least at a prescribed level; and
   at least one dent opening downwardly formed on the central portion of said hood panel for rendering the panel bendable so that only the central portion is raised when encountering an impact placed on said hood panel in the front-rear direction of the automotive vehicle,
   thereby preventing the plunge of said hood panel into the passenger room of the vehicle in case of accidents.

2. A hood as claimed in claim 1, in which said reinforcement portion comprises a flange formed at one edge of said hood panel.

3. A hood as claimed in claim 2, in which the pair of flanges are formed by inwardly folding both side edges of said hood panel and include side plates and bottom plates respectively.

4. A hood as claimed in claim 3, wherein said dent section is formed by depressing the bottom plate in a trapezoid form toward said hood panel.

5. A hood as claimed in claim 3, in which the pair of flanges further include slant plates respectively.

6. A hood as claimed in claim 2, in which said deformable portion is formed in central position of the substantial entire length of said flange.

7. A hood as claimed in claim 2, in which the flanges is formed in the front and rear edges of said hood panel.

8. A hood as claimed in claim 7, in which said deformable portion comprises a bead on a inner, surface of said hood panel.

9. In an automotive vehicle having a passenger cabin, and a front engine compartment covered by a hood, said hood having longitudinal side edges, the improvement comprising:
   reinforcement means incorporated into the hood, said reinforcement means including flanges formed by inwardly folding both longitudinal side edges of said hood, each of said flanges including a side plate and a bottom plate;
   a notch disposed in each said flange along the central portion of said hood, each said notch including a cutout in said bottom plate and the lower portion of said side plate, said cutouts passing completely through said bottom plate and said lower portion of said side plate;
   wherein said notches reduce the strength of said hood at the notch locations, such that during collision of the vehicle, said hood buckles at said notch locations thereby preventing said hood from entering the passenger cabin of the vehicle.

10. A hood as claimed in claim 9, in which said deformable portion includes a notch portion and an upper portion, the notch portion being formed by cutting the bottom plate and the lower portion of the side plate with a very narrow space as compared with the length of the flange, the upper portion being formed by the remaining upper section of the cut side plate.

11. A hood as claimed in claim 10, further comprising a reinforcement member being laid on the lower surface of said hood panel and attached by hemming and bonding its edges with edges of said hood panel.

12. A hood for an automotive vehicle comprising:
   a hood panel;
   a pair of flanges being formed by inwardly folding both side edges of said hood panel, each of said flange includes a side plate and a bottom plate; and
   a pair of deformable portions for doubling said hood panel when a strong impact exceeding a predetermined load is applied to said hood panel in the front-rear direction of the automotive vehicle upon collision accidents, said deformable portions being formed in central positions of the substantial entire length of said flanges respectively, said deformable portions including notch portions and upper portions respectively, the notch portions being formed by cutting bottom plates and the lower portions of the side plates with very narrow spaces as compared with the lengths of said flanges, and the upper portions being formed by the remaining upper sections of the cut side plates.

13. In an automotive vehicle having a passenger cabin, and a front engine compartment covered by a hood, said hood having longitudinal side edges, the improvement comprising:
   reinforcement means incorporated into the hood, said reinforcement means including flanges formed by inwardly folding both longitudinal side edges of said hood, each of said flanges including a side plate and a bottom plate;

a dent section disposed in each flange along the central portion of said hood, each said dent section including a portion of said bottom plate formed into a trapezoidal shape extending toward the unfolded portion of said hood and a cutout in the lower portion of said side plate adjacent said trapezoidal shape, said cutout passing completely through a said lower portion of said side plate;

wherein said dent sections reduce the strength of said hood at the dent section locations, such that during collision of the vehicle, said hood buckles at said dent section locations thereby preventing said hood from entering the passenger cabin of the vehicle.

* * * * *